United States Patent

[11] 3,626,897

| [72] | Inventor | George G. Kliewer |
| | | Fresno, Calif. |
| [21] | Appl. No. | 99,337 |
| [22] | Filed | Dec. 18, 1970 |
| [45] | Patented | Dec. 14, 1971 |
| [73] | Assignees | Dun-Rite Manufacturing Corp. |
| | | Fresno, Calif. ; |
| | | Continuation-in-part of application Ser. No. 801,362, Feb. 24, 1969, now Patent No. 3,548,780. This application Dec. 18, 1970, Ser. No. 99,337 |

[54] RETENTION CAP FOR EXTENSIBLE STAFF-TYPE TEMPERATURE INDICATOR
6 Claims, 4 Drawing Figs.

| [52] | U.S. Cl. | 116/114.5 |
| [51] | Int. Cl. | G01k 11/00 |
| [50] | Field of Search | 116/114.5; 73/358; 215/41 |

[56] References Cited
UNITED STATES PATENTS

| 1,450,769 | 4/1923 | Crosby | 116/34 |
| 2,873,609 | 2/1959 | Von Wangeheim | 73/358 |
| 3,280,629 | 10/1966 | Kliewer | 116/114.5 X |
| 3,247,992 | 4/1966 | Exron | 215/41 |

Primary Examiner—Louis R. Prince
Assistant Examiner—Daniel M. Yasich
Attorney—Naylor & Neal ABSTRACT: A retention cap for use in combination with a temperature indicator of the type having a staff received within a housing for axial extension relative thereto upon the attainment of a predetermined internal temperature. The cap is secured over the staff to restrain the staff against extension under cooking conditions wherein the predetermined internal temperature is achieved at a point in time prior to the time the cap reaches a predetermined external temperature greater than said predetermined internal temperature. The cap comprises a plug held in place by a membrane which, upon attainment of said predetermined external temperature weakens sufficiently to permit release of the plug and substantially unrestricted extension of the staff.

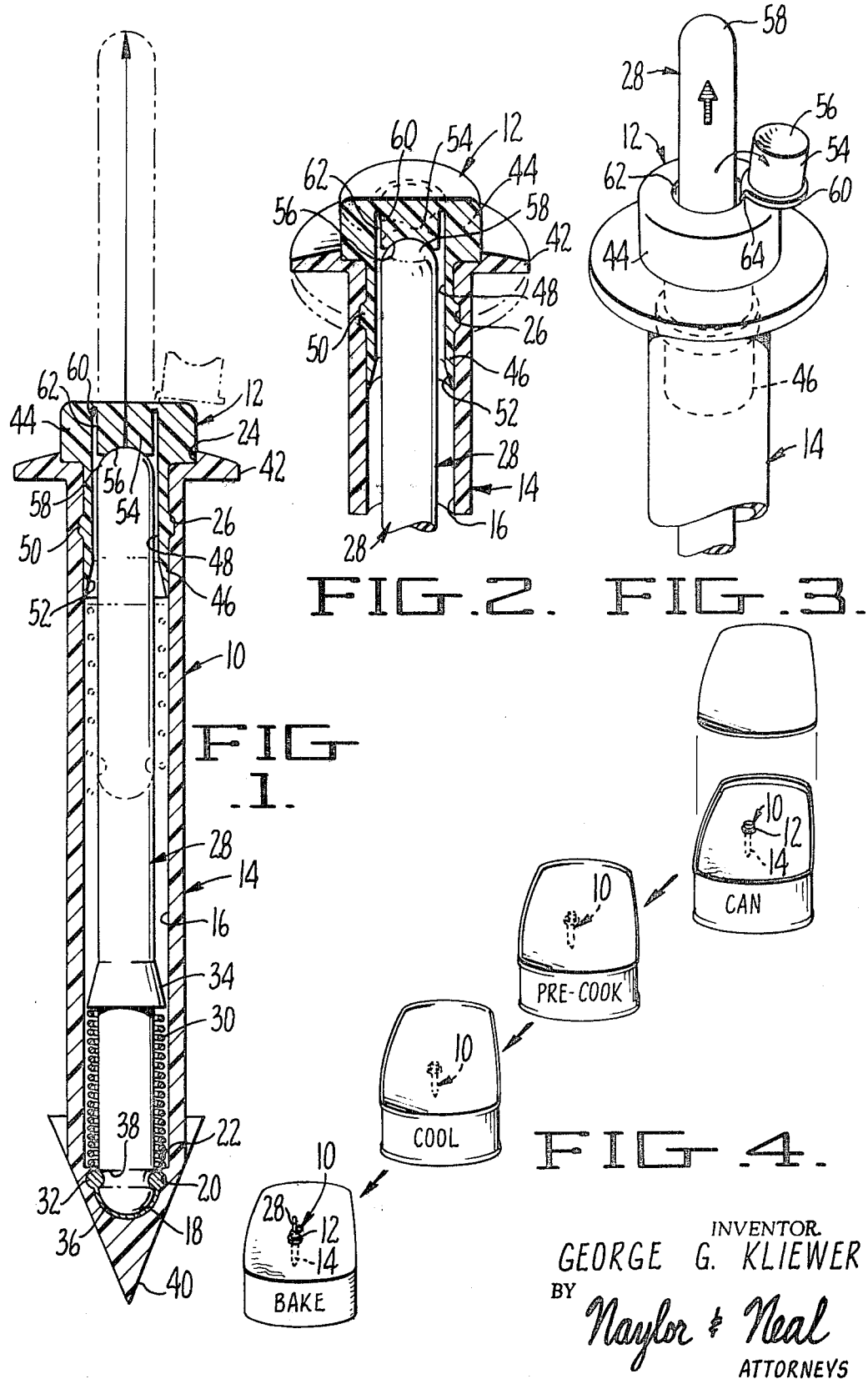

3,626,897

RETENTION CAP FOR EXTENSIBLE STAFF-TYPE TEMPERATURE INDICATOR

RELATED APPLICATIONS

The present application is a continuation-in-part of my copending application Ser. No. 801,362, filed Feb. 24, 1969 and entitled TEMPERATURE SIGNALING DEVICE and now U.S. Pat. No. 3,548,780. The retention structure disclosed in the present application corresponds to that illustrated and described in my copending application Ser. No. 410,603, filed Nov. 12, 1964 and entitled TEMPERATURE INDICATOR.

BACKGROUND OF THE INVENTION

The invention of the instant application is concerned with an improvement to render temperature indicators of the type illustrated and described in my aforementioned copending application Ser. No. 410,603 suitable for prepackaging with canned meats, such as ham, wherein the meat is precooked while in the can. In particular, it is concerned with an arrangement to prevent the temperature indicator from prematurely releasing during the period the meat is precooked in the can, while at the same time permitting normal operation of the indicator when the meat is removed from the can and oven cooked.

The prepackaging of temperature indicators with canned meats presents a particular problem, since these meats are typically brought to a precooking temperature in the can in excess of the temperature to which the meat is ideally brought during oven cooking by the ultimate consumer. For example, canned hams are typically precooked in the can at a temperature of 162° F. for 6 to 8 hours, while the ultimate consumer ideally oven cooks the ham to a temperature of only 120° F. Thus, a temperature indicator designed for use in canned hams ideally releases at 120° F. This means that the indicator would normally release during precooking in the can at 162° F. As a result, if such an indicator were used in a canned ham, it would be triggered and useless for cooking purposes prior to the time the ham was removed from the can.

It is, accordingly, a principal object of the present invention to provide a retention cap for use with a temperature indicator of the type shown in my copending application Ser. No. 410,603 to render the indicator suitable for prepackaging with canned meats.

Another and more specific object is to provide such a cap which does not interfere with normal operation of the indicator during oven cooking.

Yet another object is to provide such a cap which remains intact during precooking in the can at temperatures in excess of those to which the meat is ultimately brought during oven cooking, but at the same time functions to release the indicator for normal operation prior to the time the meat reaches desired internal temperature during ultimate oven cooking.

Still another object of the invention is to provide a cap which functions to secure the retention structure of an extensible staff-type indicator against release, even though the indicator is at a temperature in excess of its normal release temperature.

A further object of the invention is to provide such a cap which also functions to limit the extent to which the staff of the indicator may extend upon ultimate release during oven cooking.

SUMMARY OF THE INVENTION

In summary, the present invention is concerned with a secondary retention device for use in a temperature indicator having a staff retained against extension relative to a housing by a fusible locking element. It is particularly concerned with the provision of means to maintain the fusible locking element intact at temperatures in excess of its temperature of fusion.

BRIEF DESCRIPTION OF THE DRAWINGS

The foregoing and other objects and the detailed structure and mode of operation of the invention will become apparent from the following detailed description and accompanying drawings wherein:

FIG. 1 is a cross-sectional elevational view of a temperature indicator of the type disclosed in my aforementioned application Ser. No. 410,603, with the cap of the present invention applied thereto. In this figure, the solid line representation shows the indicator staff in the retracted position and the phantom line representation shows the staff in the extended position.

FIG. 2 is a cross-sectional perspective view illustrating the upper portion of the indicator shown in FIG. 1, with parts thereof broken away and the staff shown in the retracted position.

FIG. 3 is a perspective view of the indicator illustrated in FIG. 1, with parts thereof broken away, showing the staff as it moves towards the extended position.

FIG. 4 is a perspective view diagrammatically illustrating an indicator embodying the present invention employed in a canned ham as it progresses through the stages which a canned ham normally progresses from canning by the processor to ultimate baking by the consumer.

DESCRIPTION OF THE ILLUSTRATED EMBODIMENT

FIG. 1 illustrates a temperature indicator 10 of the general type disclosed in my copending application Ser. No. 410,603, with the exception that it is provided with a cap 12 constructed according to the present invention. The principal element of the indicator 10 comprises a housing 14 having an axially extensive bore 16 formed therein. The lower end of the bore (as viewed in FIG. 1) is closed and defined by a concave hemispherical surface 18 having an annular groove 20 extending therearound. A stepped shoulder 22 is formed in the housing immediately above the groove 20. The upper end of the bore is open and formed with an annular recess 24 at its distal end and an annular groove 26 disposed in spaced relationship to the recess.

The basic structure of the indicator 10 is completed by a staff 28 slidably received within the bore 16 for movement between the retracted and extended positions illustrated in solid and phantom line representations, respectively, in FIG. 1; a compression coil spring 30 concentrically received around the staff within the housing; and, a fusible locking element 32 confined within a chamber between the staff and housing to normally lock the staff in the retracted position. The staff is formed intermediate its ends with a collar 34 and the spring 30 is interposed between this collar and the shoulder 22. Thus, the spring functions to normally urge the staff to the extended position. The lower end of the staff is formed with a convex hemispherical surface 36 complementally nestable with the surface 18 and a groove 38 positioned so as to be in opposed aligned relationship with the groove 20 when the staff is in the retracted position. In the latter position, the grooves 20 and 38 define the chamber within which the fusible element 32 is received.

Externally, the housing 14 is formed with a barbed point 40 at the closed end and a collar 42 at the open end. The point 40 facilitates insertion of the indicator into an article of meat and retention of the indicator when so inserted. The collar 42 limits the extent to which the indicator may be inserted.

With the exception of the mode of operation of the cap 12, the operation of the indicator 10 corresponds to that of my copending application Ser. No. 410,603. Accordingly, the fusible locking element 32 is positioned by displacing it into the condition illustrated in FIG. 1 while in a fused state. Once so positioned, the element is frozen and, thus, the staff is locked in the retracted position. Upon elevation of the retention element to its yield temperature, it yields responsive to the force imparted by the spring 30 and, thus, releases the staff for movement to the extended position. The latter movement may only occur, however, if the cap 12 is first conditioned so as not to interfere with extension of the staff.

Referring now specifically to the structure of the cap 12, this is integrally formed of injection molded polyethylene. A preferred form of material has been found to be Eastman Tenite Polyethylene No. 4312.

The cap comprises a head 44 having a sleeve 46 extending therefrom and proportioned for snug receipt within the bore 16. The sleeve is formed with an internal passage 48 proportioned for loose receipt of the staff 28 and an external annular collar 50 positioned and proportioned for locking engagement with the groove 26. The lower end of the sleeve 46 terminates in a frustoconical surface 52 proportioned to assume abutting sealed engagement with the collar 34 when the staff 28 is in the extended position. Thus, the surface 52 functions to both limit the degree to which the staff may be extended and to seal the interior of the indicator when the staff is extended.

The head 44 is externally proportioned for receipt in the recess 24 when the collar 50 is received within the groove 26. Internally, the head is formed with a plug 54 having a hemispherical concave lower surface 56 proportioned for abutting engagement with the upper end of the staff 28 when the staff is in the retracted position and the cap is fully in place. This condition may best be seen from FIG. 2 wherein the upper end of the staff is shown as being of convex hemispherical configuration and designated by the numeral 58.

The plug 54 is an integral portion of the head 44, but is only secured thereto by a relatively thin annular membrane 60. An annular groove 62 is formed around the plug beneath the membrane. The groove 62 is a continuation of the passage 48 and has the same outside diameter. When the temperature indicator utilizes a spring 30 having a force of 300 grams and the cap is formed of the preferred polyethylene specified in the foregoing description, it has been found preferable to fabricate the membrane 60 so as to have a thickness of 0.010, an O.D. of 0.140 inches, and an I.D. of 0.123 inches.

It is here noted that the resilient defection characteristics of the cap 12 and housing 14 are such that the cap may be forced into the assembled position illustrated in the drawings. Once so positioned, the collar 50 functions to retain the cap against inadvertent displacement from the housing. Ideally, the cap is assembled into position at the time the fusible locking element 32 is being displaced into the configuration shown in FIG. 1.

With the cap 12 assembled into place, the staff 28 cannot extend until such time as the membrane 60 is heated to a temperature sufficient to render it frangible responsive to the force of the spring 30. Accordingly, if the fusible locking element 32 is heated to its yield temperature prior to the time the membrane is heated to the temperature wherein it is thus frangible, the cap will maintain the staff in the retracted position. This means that the fusible element will remain within the chamber defined by the grooves 20 and 38 and that if the fusible element is subsequently lowered to its freezing temperature, it will once again function to lock the staff in the retracted position.

The preferred mode of frangible release of the membrane 60 is illustrated in FIG. 3. As there shown, the membrane has torn over all but a very limited length of its periphery and has swung about the hinge provided by this limited length. The hinge is designated by the numeral 64. The arrow lines in FIG. 3 designate the direction of extension of the staff and the resulting direction of swinging of the plug.

While FIG. 3 illustrates the preferred mode of frangible operation to the membrane 60, it should be understood that this is not the only mode of operation which might occur. It is also possible, for example, that the periphery of the membrane 60 might fully fracture and that the plug might be speared and completely lifted by the staff. As yet another alternative, it is possible that the material of the membrane and plug might so soften that it is stretched responsive to extension of the rod. In this event, the material of the membrane and plug would string down around the sides of the extended staff. With either of these alternative modes of operation, it is likely that the material of the plug would securely adhere to the staff, since the material would be in a partially melted condition.

The preferred embodiment of the cap herein illustrated and described is designed for use with canned hams which are precooked in the can by the processor at 162° F. for 6 to 8 hours and, ideally, baked by the ultimate consumer to an internal temperature of 120° F. in an oven having a temperature of 325° F. This process is diagrammatically illustrated in FIG. 4 wherein a ham is shown as first being canned with the temperature indicator in place, then precooked in the can, then cooled in the can, and finally removed from the can and oven baked. With this sequence, it is necessary that the temperature indicator remain cocked during precooking and that upon ultimate baking it release. This operation is achieved through the employment of the present invention, since the cap 12 functions to retain the staff in the retracted "cocked" position during precooking at 162° F., even though the fusible locking element 32 has a yield temperature of 120° F. Thus, upon cooling of the ham in the can after precooking, the fusible locking element 32 returns to the staff retaining condition illustrated in FIG. 1. When the ham is removed from the can and baked in an oven at 325° F., the membrane 60 reaches the temperature wherein it is frangible responsive to the force of the spring 30 long prior to the time the ham reaches desired internal temperature of 120° F. Accordingly, upon reaching this internal temperature and the yielding of the element 32, the staff is free to extend to the extended position responsive to the force of the spring 30.

While a preferred embodiment has been illustrated and described, it should be understood that the invention is not limited to this specific embodiment. For example, it is possible that the cap might be employed with a temperature indicator having a different internal retention structure. Ideally, however, this structure should be of the type which will assume locked condition upon returning to a temperature below of its release temperature after having been elevated above this temperature.

I claim:

1. In a temperature responsive signaling device of the type comprising:

I. a tubular housing defining an axially extensive bore closed at one end and open at the other end;

II. an indicator staff received within the bore for slidable movement between retracted and extended positions relative to the housing;

III. biasing means disposed to normally urge the staff to its extended position relative to the housing;

IV. a fusible locking element confined within a chamber to normally lock the staff in the retracted position, said element being yieldable responsive to the biasing means upon being elevated to a first predetermined temperature to release the staff for movement to the extended position;

the improvement comprising a cap closing the open end of the bore, said cap having a portion extending over the staff when the staff is in the retracted position to normally restrain the staff against extension to the extended position responsive to the biasing means, said portion, upon reaching a second predetermined temperature which is higher than said first predetermined temperature, being frangible responsive to the force imparted to the staff by the biasing means to release the staff for extension to the extended position.

2. In a temperature responsive signaling device according to claim 1 wherein a stop shoulder is fixed to and disposed intermediate the ends of the staff; the improvement further comprising a sleeve formed on said cap and extending therefrom into the bore of the housing, said sleeve being proportioned for abutting engagement with the shoulder upon movement of the staff to the extended position to limit axial extension of the staff relative to the housing.

3. In a temperature responsive signaling device according to claim 1, the improvement wherein the cap comprises:

a. a sleeve extending into the bore of the housing, said sleeve being proportioned to permit the staff to slide freely therethrough between the retracted and extended positions;

b. a plug disposed in the end of the sleeve so as to be positioned over and in abutting engagement with the rod when the rod is in the retracted position; and, c. a thin membrane secured to and between the sleeve and plug to secure the plug against displacement from the sleeve responsive to force imparted to the staff by the biasing means upon fusion of said locking element prior to the time said membrane attains the second predetermined temperature, said membrane, upon the attainment of said second predetermined temperature, softening to release the plug for displacement responsive to the force imparted thereto by the biasing means upon yielding of the fusible locking element.

4. In combination with a temperature indicator comprising a tubular housing defining an axially extensive bore closed at one end and open at the other end, an indicator staff received within the bore for slidable movement between retracted and extended positions relative to the housing, and biasing means disposed to normally urge the staff to its extended position relative to the housing; the improvement comprising a cap closing the open end of the bore, said cap having a portion extending over the staff when the staff is in the retracted position to normally restrain the staff against extension to the extended position responsive to the biasing means, said portion upon reaching a predetermined temperature being frangible responsive to the force imparted to the staff by the biasing means to release the staff for extension to the extended position.

5. In a temperature responsive signaling device according to claim 4 wherein a stop shoulder is fixed to and disposed intermediate the ends of the staff; the improvement further comprising a sleeve formed on said cap and extending therefrom into the bore of the housing, said sleeve being proportioned for abutting engagement with the shoulder upon movement of the staff to the extended position to limit axial extension of the staff relative to the housing.

6. In a combination according to claim 4, the improvement wherein the cap comprises:

a. a sleeve extending into the bore of the housing, said sleeve being proportioned to permit the staff to slide freely therethrough between the retracted and extended positions;

b. a plug disposed in the sleeve so as to be positioned over and in abutting engagement with the rod when the rod is in the retracted position; and, c. a thin membrane secured to and between the sleeve and plug to secure the plug against displacement from the sleeve responsive to the force imparted to the staff by the biasing means prior to the time the membrane reaches said predetermined temperature, said membrane, upon the attainment of the predetermined temperature, softening to release the plug for displacement responsive to the force imparted thereto by the biasing means.

* * * * *